US007615766B2

(12) United States Patent
Nakano

(10) Patent No.: US 7,615,766 B2
(45) Date of Patent: Nov. 10, 2009

(54) TARGET SUPPLIER

(75) Inventor: Masaki Nakano, Yokohama (JP)

(73) Assignees: Komatsu Ltd., Tokyo (JP); Gigaphoton Inc., Tokyo (JP)

( * ) Notice: Subject to any disclaimer, the term of this patent is extended or adjusted under 35 U.S.C. 154(b) by 303 days.

(21) Appl. No.: 11/723,347

(22) Filed: Mar. 19, 2007

(65) Prior Publication Data

US 2007/0228301 A1 Oct. 4, 2007

(30) Foreign Application Priority Data

Mar. 28, 2006 (JP) ............................ 2006-088245

(51) Int. Cl.
*G01J 1/18* (2006.01)

(52) U.S. Cl. .............................. 250/504 R; 250/503.1; 250/493.1; 250/492.1

(58) Field of Classification Search ............ 250/504 R, 250/503.1, 492.1, 493.1
See application file for complete search history.

(56) References Cited

U.S. PATENT DOCUMENTS 7,361,918 B2 * 4/2008 Akins et al. ............ 250/504 R
7,394,083 B2 * 7/2008 Bowering et al. ....... 250/504 R
7,405,416 B2 * 7/2008 Algots et al. ............ 250/493.1
7,476,884 B2 * 1/2009 Gaebel et al. ........... 250/504 R
7,525,111 B2 * 4/2009 Bowering ............... 250/504 R
2003/0189176 A1 * 10/2003 Chichkov et al. ..... 250/396 ML
2004/0238762 A1 * 12/2004 Mizoguchi et al. ...... 250/504 R
2005/0205810 A1 * 9/2005 Akins et al. ............. 250/504 R
2006/0176925 A1 * 8/2006 Nakano ....................... 372/69
2007/0001130 A1 * 1/2007 Bykanov et al. ......... 250/493.1
2008/0017801 A1 * 1/2008 Fomenkov et al. ....... 250/354.1

FOREIGN PATENT DOCUMENTS

JP 2003-297737 10/2003

* cited by examiner

*Primary Examiner*—David A Vanore
*Assistant Examiner*—Michael J Logie
(74) *Attorney, Agent, or Firm*—Wenderoth, Lind & Ponack, L.L.P.

(57) ABSTRACT

A target supplier accelerates a target material injected from a nozzle such that a velocity of the target material after accelerated is kept within a predetermined range. The target supplier includes: a target nozzle that injects a target material in a liquid droplet state or solid particle state; an electric charge supplying unit that supplies electric charge to the target material; a charge amount measuring unit that measures an amount of the electric charge supplied to the target material by the electric charge supplying unit; a control unit that controls the electric charge supplying unit in a feedback manner based on a measurement result obtained by the charge amount measuring unit; and an accelerator that accelerates the target material supplied with the electric charge by the electric charge supplying unit.

10 Claims, 6 Drawing Sheets

TARGET SUPPLIER

BACKGROUND OF THE INVENTION

1. Field of the Invention

The present invention relates to a target supplier for supplying a target material in an EUV (extreme ultra violet) light source device of an LPP (laser produced plasma) type.

2. Description of a Related Art

As semiconductor processes become finer, photolithography has been making rapid progress toward finer fabrication, and, in the next generation, microfabrication of 100 nm to 70 nm, further, microfabrication of 50 nm or less will be required. For example, in order to fulfill the requirement for microfabrication of 50 nm or less, the development of exposure equipment with a combination of an EUV light source of about 13 nm in wavelength and a reduced projection reflective optics is expected.

As the EUV light source, there are three kinds of an LPP (laser produced plasma) type using plasma generated by irradiating a target material with a laser beam, a DPP (discharge produced plasma) type using plasma generated by discharge, an SR (synchrotron radiation) type using orbital radiation. Among them, the LPP light source has advantages that extremely high intensity near black body radiation can be obtained because plasma density can be made considerably large, light emission of only the necessary waveband can be performed by selecting the target material, and an extremely large collection solid angle of $2\pi$ sterad can be ensured because the light source is a point source having substantially isotropic angle distribution and there is no structure such as electrodes surrounding the light source. Accordingly, the LPP type EUV light source device is thought to be predominant as a light source for EUV lithography requiring power of several tens of watts.

Now, a principle of generating EUV light in the LPP type EUV light source device will be briefly explained. By applying a laser beam to a target material injected from a nozzle, the target material is excited to a plasma state. Various wavelength components including EUV light are emitted from the plasma. Accordingly, a condenser mirror (EUV light collector mirror) having a reflection surface for selectively reflecting a desired wavelength from among the wavelength components is used to reflect and collect the EUV light and output the EUV light to an exposure device. For example, a film (Mo/Si multilayered film), in which molybdenum and silicon are stacked alternately, is formed on the reflection surface in order to collect an EUV light having a wavelength of about 13.5 nm.

In view of efficiency in generating the EUV light and an amount of emission of debris, which are leavings of the target material, and so on, study of proper materials as the target material and proper state thereof (gaseous state, liquid state or solid state) to be used in the LPP type EUV light source has been advanced. Further, as a method of supplying a liquid target, a method of generating a continuous stream of the target material (hereinafter, this method is called "a target jet method") and a method of generating droplets of the target material at a predetermined time interval or distance interval (hereinafter, this method is called "a droplet target method") is used. Comparing those two methods, the droplet target method is considered to have an advantage to the target jet method in the following points. According to the target jet method, it is difficult to generate a jet stream having stable position and form at an area away from the nozzle. Further, a diameter of the jet stream cannot be large, and therefore, an output of the EUV light cannot be large. Furthermore, the target material is always injected from the nozzle irrelevant to an interval of the laser pulse, and therefore, an amount of the debris becomes large.

One problem caused in the LPP type EUV light source device is that, the nozzle for injecting the target material (target nozzle) is easily degraded because the target nozzle is damaged by heat of the target material, which is turned into a plasma state, or ions of the target material emitted therefrom. In order to solve the problem, it is thought that the plasma generation point is arranged as far as possible from the target nozzle. However, as another problem, in the case where a distance between the target nozzle and the plasma generation point (hereinafter, this distance is called "a working distance") is longer, a density of the droplet becomes lower because diffusion of the droplet occurs until the droplet arrives at the plasma generation point. As a result, an amount of the generated EUV light becomes less. Especially, in the case where xenon (Xe) is used as the target material, a velocity of the droplet is low, and therefore, such problem becomes prominent.

In order to solve such problem, Japanese Patent Application Publication JP-P2003-297737A discloses an EUV light source device for generating EUV light having a wavelength of several nanometers to several tens nanometers by irradiating a target with a laser beam emitted from a driver laser device to generate plasma. The EUV light source device includes a target supplying device having electric charge supplying means for supplying electric charge to a target, and accelerating means for accelerating the target supplied with the electric charge by using an electromagnetic field. That is, by accelerating the droplet target to reach the plasma generation point in a short time, the working distance can become larger.

However, in fact, each droplet target is not always supplied with a constant amount of electric charge. If the amount of electric charge is varied, the acceleration supplied by the accelerating means is varied. Thereby, a time difference occurs at a time point when the droplet target reaches the irradiating point of the laser beam. As a result, a time difference also occurs at the plasma generation timing, that is, the EUV light generation timing. Therefore, in order to generate pulses of the EUV light at a constant time interval, it is required that the velocity of the droplet target after accelerated is made constant.

SUMMARY OF THE INVENTION

The present invention has been achieved in view of the above-mentioned problems. An object of the present invention is to provide a target supplier which can accelerate a target material injected from a nozzle such that a velocity of the target material after acceleration is kept within a predetermined range in the LPP type EUV light source device.

In order to achieve the above object, a target supplier according to a first aspect of the present invention is a target supplier to be used in an extreme ultra violet light source device for generating extreme ultra violet light by irradiating a target material with a laser beam emitted from a laser light source to turn the target material into a plasma state, and the target supplier comprises: a target nozzle that injects a target material in one of a liquid droplet state and a solid particle state; an electric charge supplying unit that supplies electric charge to the target material; a charge amount measuring unit that measures an amount of the electric charge supplied to the target material by the electric charge supplying unit; control means that controls the electric charge supplying unit in a feedback manner based on a measurement result obtained by the charge amount measuring unit; and an accelerator that accelerates the target material supplied with the electric charge by the electric charge supplying unit.

Further, a target supplier according to a second aspect of the present invention is a target supplier to be used in an extreme ultra violet light source device for generating extreme ultra violet light by irradiating a target material with a laser beam emitted from a laser light source to turn the target material into a plasma state, the target supplier comprising: a target nozzle that injects a target material in one of a liquid droplet state and a solid particle state; an electric charge supplying unit that supplies electric charge to the target material; a charge amount measuring unit that measures an amount of the electric charge supplied to the target material by the electric charge supplying unit;

an accelerator that accelerates the target material supplied with the electric charge by the electric charge supplying unit; and control means that controls the accelerator based on a measurement result obtained by the charge amount measuring unit.

According to the present invention, the amount of electric charge supplied to the target materially the electric charge supplying unit is measured, and the electric charge supplying unit is controlled in a feedback manner or the accelerator is controlled based on the measurement result. As a result, a velocity of the target material after accelerated can be kept within a predetermined range.

DESCRIPTION OF THE PREFERRED EMBODIMENTS

Figure 1:
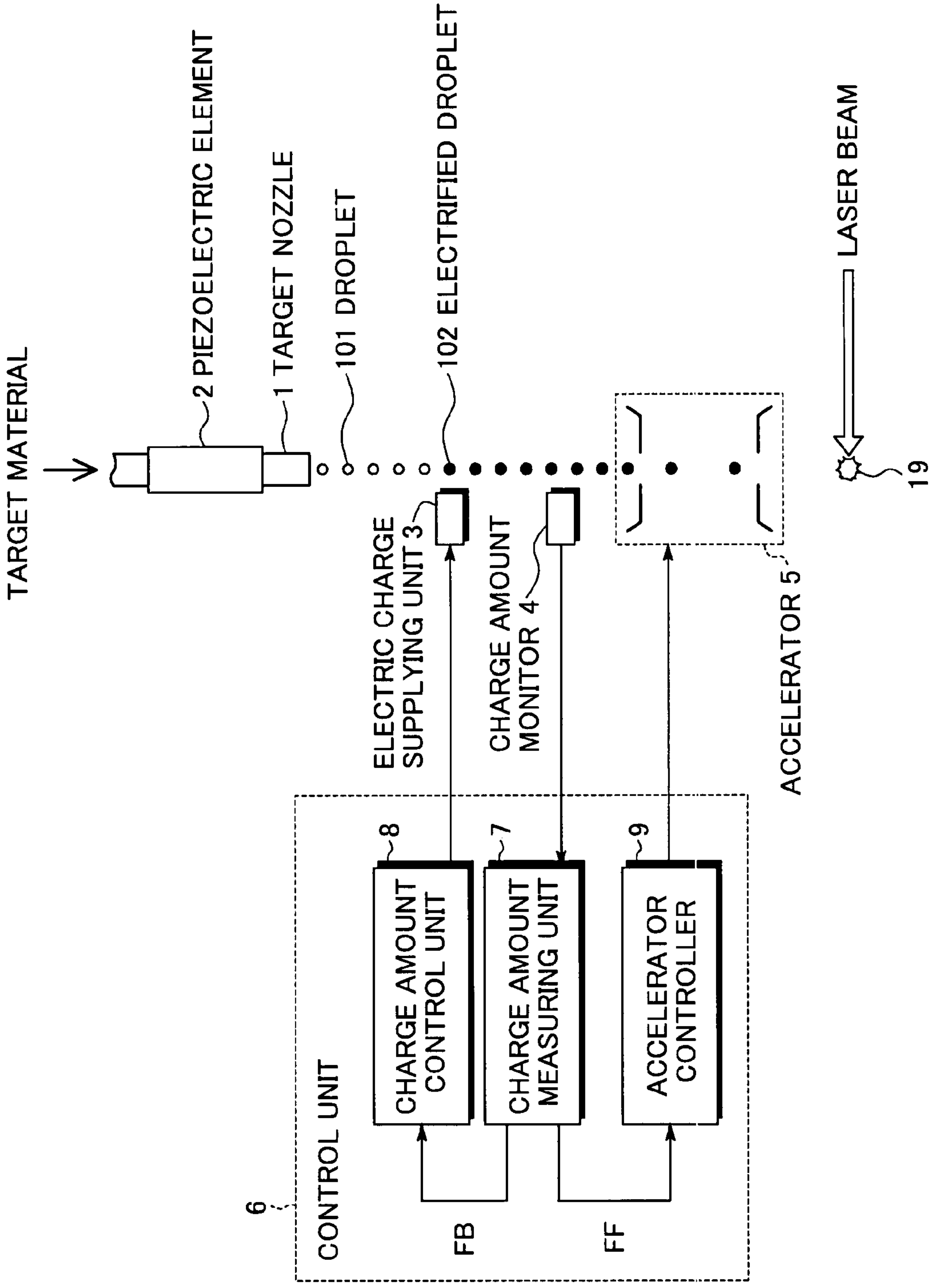
FIG. 1 is a schematic diagram showing a structure of a target supplier according to one embodiment of the present invention.

Hereinafter, preferred embodiments of the present invention will be described in detail by referring to the drawings. The same reference numerals are assigned to the same component elements and the description thereof will be omitted.

FIG. 1 is a schematic diagram showing a structure of a target supplier according to one embodiment of the present invention.

The target supplier according to the embodiment includes a target nozzle 1, a piezoelectric element 2, an electric charge supplying unit 3, a charge amount monitor 4, an accelerator 5, and a control unit 6.

Figure 2:
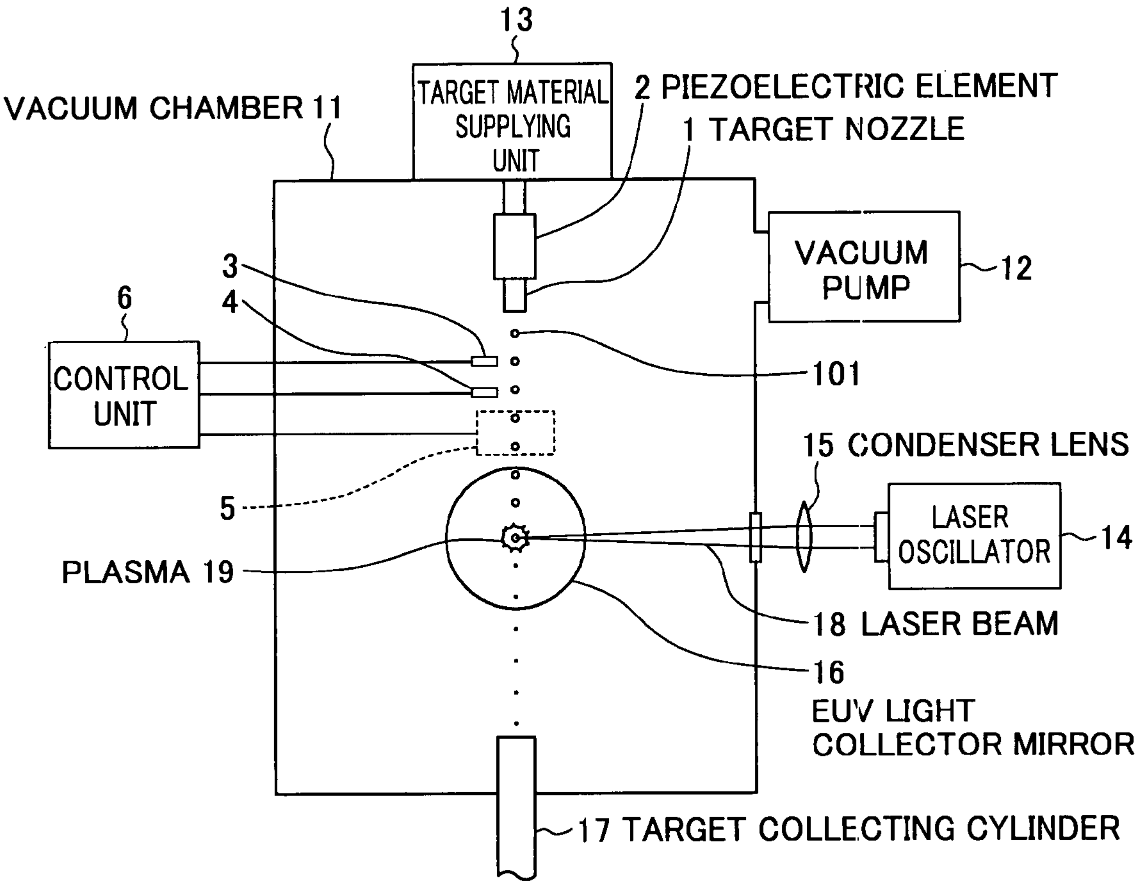
FIG. 2 is a schematic diagram showing at structure of an EUV light source device provided with the target supplier as shown in FIG. 1.

FIG. 2 is a schematic diagram showing a structure of an EUV (extreme ultra violet) light source device including the target supplier as shown in FIG. 1. First, referring to FIG. 2, the structure and operation of the EUV light source device will be explained.

The EUV light source device as shown in FIG. 2 is an LPP (laser produced plasma) type device which irradiates a target material with a laser beam to turn the target material into a plasma state and collect an EUV light emitted from the plasma state. In addition to the target supplier as shown in FIG. 1, the EUV light source device includes a vacuum chamber 11, an vacuum pump 12 which keeps the predetermined degree of vacuum in the vacuum chamber 11, a target material supplying unit 13, a laser oscillator 14, a condenser lens 15, an EUV light collector mirror 16, and a target collecting cylinder 17.

The target material supplying unit 13 supplies a target material such as xenon (Xe) or stannum (Sn) to the nozzle 1. The target material is excited to a plasma state by irradiated with a laser beam. Although an explanation will be made in the case where the target material is injected in a liquid state, the present invention applies in the case where the target material is in a gaseous state, liquid state or solid state under a room temperature and a room pressure. For example, in the case where a target material such as xenon, which is in a gaseous state under a room temperature, is used as a liquid target, the target material supplying unit 13 liquefies xenon gas by pressurizing and cooling the xenon gas and supplies liquid xenon to the target nozzle 1. On the other hand, in the case where a target material such as stannum, which is in a solid state under a room temperature, is used as a liquid target, the target material supplying unit 13 liquefies stannum by heating and supplies liquid stannum to the target nozzle 1.

The target nozzle 1 injects a liquid target material, which is supplied from the target material supplying unit 13, to the vacuum chamber 11. The piezoelectric element 2 provides vibration having a predetermined frequency "f" to the target nozzle 1 by expanding and contracting according to the drive signal supplied from outside. Thus, through the target nozzle 1, the piezoelectric element 2 disturbs a flow of target material (target jet) injected from the target nozzle 1 so as to form a target in a liquid droplet state repetitively dropping, which is called "droplet target" or simply "droplet" 101. Here, supposing that a velocity of the target jet is "v", a wavelength of the vibration added to the target jet is "λ" ($\lambda=v/f$), and a diameter of the target jet is "d", a droplet having a desired uniform size can be formed in the case where a predetermined condition (for example, $\lambda/d=4.51$) is satisfied. The frequency "f" of disturbance to be generated in the target jet is called a Rayleigh frequency. Actually, in the case where $\lambda/d$ is within a range from about 3 to about 8, droplets having an almost uniform size can be formed. Since the velocity "v" of the target jet injected from a nozzle generally used in the EUV light source device is about 20 m/s to 30 m/s, a frequency to be provided to the nozzle becomes several tens kHz to several hundreds kHz to generate droplets having a diameter of about 10 μm to 100 μm.

The laser oscillator 14 is a light source which can perform pulse oscillation in a high repetitive frequency, and emits a laser beam 18 for irradiating a target material to be excited. The condenser lens 15 corresponds to a condensing optical system for condensing a laser beam emitted from the laser oscillator 14 into a predetermined position. Although one condenser lens 15 is used as the condensing optical system in the embodiment, the condensing optical system may be constructed by employing other optical component or combination of plural optical components.

The EUV light collector mirror 16 corresponds to a condensing optical system which collects a predetermined wavelength component (e.g. EUV light having a wavelength of about 13.5 nm) from among various wavelength components emitted from the target material which is turned into a plasma state (plasma) 19. The EUV light collector mirror 16 has a concaved reflection surface, on which a multilayered film of molybdenum (Mo) and silicon (Si) is formed for selectively reflecting EUV light having a wavelength of about 13.5 nm, for example. EUV light is reflected and collected by the EUV light collector mirror 16, and the collected EUV light is guided into an exposure device, for example. A condensing optical system for the EUV light is not limited to the EUV light collector mirror 16 as shown in FIG. 2, but may be constructed by employing plural optical parts. However, the condensing optical system for the EUV light is required to be a reflection type optical system in order to suppress absorption of the EUV light.

The target collecting cylinder 17 is arranged at a position opposite to the target nozzle 1 across the plasma generation point at which the target material is irradiated with the laser beam. The target collecting cylinder 17 collects the target material which is injected from the target nozzle 1 but not turned into a plasma state without irradiated with the laser beam. Thereby, it is prevented that unnecessary target material is scattered to contaminate the EUV light collector mirror 16 and that a degree of vacuum in the chamber is reduced.

Referring again to FIG. 1, the electric charge supplying unit 3 is a device for supplying droplet 101 with electric charge to electrify the droplet 101. The electric charge supplying unit 3 includes an electrode and a power unit for electrification, an electron gun, or a plasma generating device.

The charge amount monitor 4 is a device for observing the droplet (electrified droplet) 102 supplied with electric charge by the electric charge supplying unit 3, and outputs the information, which is used for calculating an amount of the electric charge, to the charge amount measuring unit 7 which will be explained later.

The concrete structures of the electric charge supplying unit 3 and the charge amount monitor 4 will be described later.

The accelerator 5 is a device for accelerating the electrified droplet 102 by applying an electrical field or a magnetic field thereto. The accelerator 5 includes, for example, electrodes for forming an electrical field or an electromagnet for forming a magnetic field on the orbit of the electrified droplet 102. Concretely, an electrostatic accelerator (e.g. Van de Graaff type accelerator) for applying a high DC voltage between electrodes to generates an electrical field thereby accelerating electrified particles may be used.

The control unit 6 controls the electric charge supplying unit 3 and/or the accelerator 5 based on the information output from the charge amount monitor 4 such that the velocity of the droplet target after accelerated is kept constant.

As shown in FIG. 1, the control unit 6 includes the charge amount measuring unit 7, the charge amount control unit 8, and the accelerator control unit 9. The charge amount measuring unit 7 measures an amount of electric charge of the droplet target based on the information output from the charge amount monitor 4.

The charge amount control unit 8 controls an operation of the electric charge supplying unit 3 in a feedback manner based on a measurement result obtained by the charge amount measuring unit 7 such that the amount of electric charge of the electrified droplet 102 is kept within a predetermined range. Concretely, the charge amount control unit 8 includes an electrification power unit for supplying a voltage to the electric charge supplying unit 3, or a gas supplier for supplying plasma gas to the electric charge supplying unit 3, or the like, and controls an output voltage of the power unit or an amount of gas supply, or the like according to the amount of electric charge of the electrified droplet 102.

Here, in the case where the droplet 101 is in a liquid state when passing through around the electric charge supplying unit 3, an amount of electric charge of the electrified droplet 102 is under restriction as follows. That is, the maximum amount of electric charge which an be supplied to the droplet is represented by the following expression.

$$Q_{MAX}=(64\pi^2\epsilon_0 r^3\sigma)^{1/2}$$

In the above expression, "$\epsilon_0$" is a dielectric constant in vacuum, "r" is a radius of the droplet, and "σ" is a surface tension of the target material.

When electric charge more than the maximum amount of electric charge $Q_{MAX}$ is supplied to the liquid state droplet, the droplet splits into plural small droplets. This is because Coulomb repulsion induced by the excess charge in the droplet becomes larger than the holding force for holding a shape of the droplet by the surface tension. Therefore, the charge amount control unit 8 is required to control the electric charge supplying unit 3 within a range where the amount of electric charge of the electrified droplet 102 is not larger than the maximum amount of electric charge $Q_{MAX}$. The maximum charge density, in which the droplet cannot split, is called a Rayleigh limit.

On the other hand, in the case where the droplet 101 is in a solid state when passing through around the electric charge supplying unit 3, an amount of electric charge of the electrified droplet 102 is not under restriction of the maximum amount of electric charge $Q_{MAX}$. Although the droplet 101 is in a liquid state when injected from the target nozzle 1, the droplet 101 becomes solidified by being cooled due to radiation or latent heat of vaporization in many cases. Therefore, by arranging the electric charge supplying unit 3 at downstream of a position where the droplet 101 turns into a solid state, the electric charge supplying unit 3 can electrify the target material in a solid particle state. In that case, the amount of electric charge of the electrified droplet 102 can be increased, and therefore, there is an advantage that an output of the accelerator 5 at downstream (e.g. an output voltage for forming an electrical field) can be smaller.

The accelerator controller 9 controls an operation of the accelerator 5 in a feedforward (FF) manner based on a measurement result obtained by the charge amount measuring unit 7 such that the velocity of the electrified droplet 102 after accelerated is kept within a predetermined range. Concretely, the acceleration controller 9 includes a power unit for supplying voltage and current to the accelerator 5, and controls the output voltage or the output current of the power unit according to the amount of electric charge of the electrified droplet 102.

Next, concrete structures of each unit of the target supplier as shown in FIG. 1 will be explained.

Figure 3:
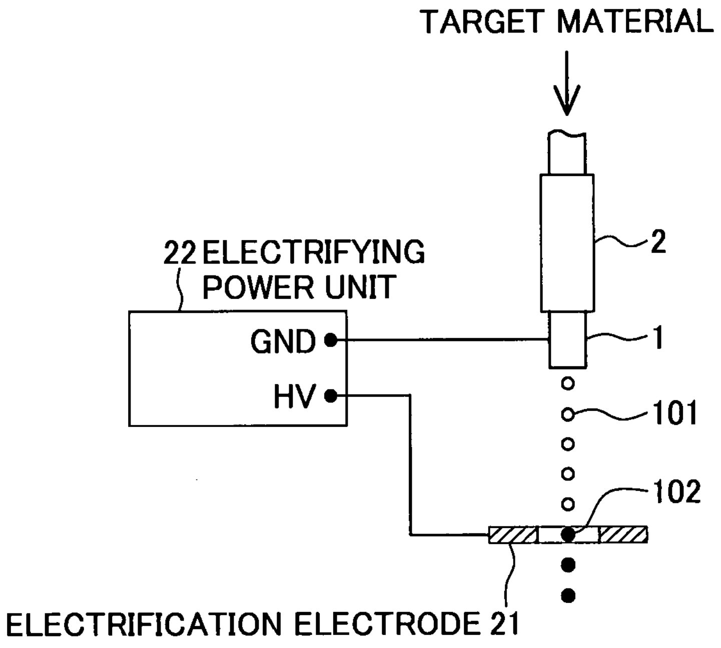
FIG. 3 is a schematic diagram showing a first example structure of an electric charge supplying unit as shown in FIG. 1.

FIG. 3 is a schematic diagram showing a first example structure of the electric charge supplying unit 3 as shown in FIG. 1. In the first example structure, as an electric charge supplying unit, an electrification electrode 21 is used in which an opening for passing the droplet 101 is provided, and the amount of electric charge of the droplet 101 is controlled by the electrifying power unit 22 included in the charge amount control unit 8 (FIG. 1).

The electrification electrode 21 is arranged at downstream of the target nozzle 1 to allow the droplet 101 to pass through the opening of the electrification electrode 21. The electrification electrode 21 is connected to the high voltage output terminal (HV), and the target nozzle 1 is connected to the ground terminal (GND) of the electrifying power unit 22. In such construction, by applying a high voltage between the electrification electrode 21 and the target nozzle 1 by the electrifying power unit 22, the droplet 101 is electrified when passing through the electrification electrode 21. The electrifying power unit 22 controls the amount of the electric charge in a feedback manner by adjusting the output voltage based on a measurement result obtained by the charge amount measuring unit 7 (FIG. 1).

The structure of the electric charge supplying unit as shown in FIG. 3 is suitable in the case where the target material has (high) conductivity. Concretely, mixture in which minute metal particles of stannum (Sn), copper (Cu) or the like or minute oxide particles of stannum oxide ($SnO_2$) or the like is dispersed into water or alcohol, or ionic solution in which lithium fluoride (LiF) or lithium chloride (LiCl) is dissolved into water, or molten metal such as melted stannum, lithium or the like can be used as the target material. As explained above, the target material may be in a liquid state or solid state when the droplet is electrified.

Figure 4:
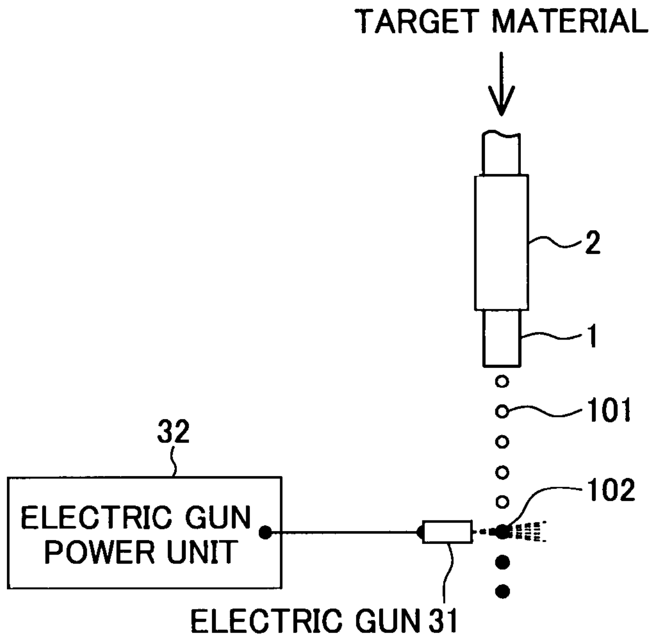
FIG. 4 is a schematic diagram showing a second example structure of an electric charge supplying unit as shown in FIG. 1.

FIG. 4 is a schematic diagram showing a second example structure of the electric charge supplying unit 3 as shown in FIG. 1. In the second example structure, an electric gun 31 is used as the electric charge supplying unit, and the amount of electric charge is controlled by the electric gun power unit 32 included in the charge amount control unit 8 (FIG. 1).

The electric gun 31 is arranged to emit electros toward the orbit of the droplet 101 injected from the target nozzle 1. Thereby, the droplet 101 is supplied with electros to be electrified when passing in front of the electric gun 31. Further, the electric gun power unit 32 controls the amount of electric charge in a feedback manner by adjusting the output voltage based on a measurement result obtained by the charge amount measuring unit 7 (FIG. 1).

The structure of the electric charge supplying unit as shown in FIG. 4 is suitable in the case where the target material has conductivity. However, it can be applied in the case where the target material has no (or low) conductivity. As described above, mixture in which minute metal or oxide particles are dispersed into water or alcohol, ionic solution including metal ions, molten metal, and so on can be used as the target material having conductivity. Further, as the target material having no (or low) conductivity, inert gas such as xenon (Xe), argon (Ar), krypton (Kr) and neon (Ne), extrapure water, alcohol, and so on can be used. As explained above, the target material may be in a liquid state or solid state when the droplet is electrified.

Figure 5:
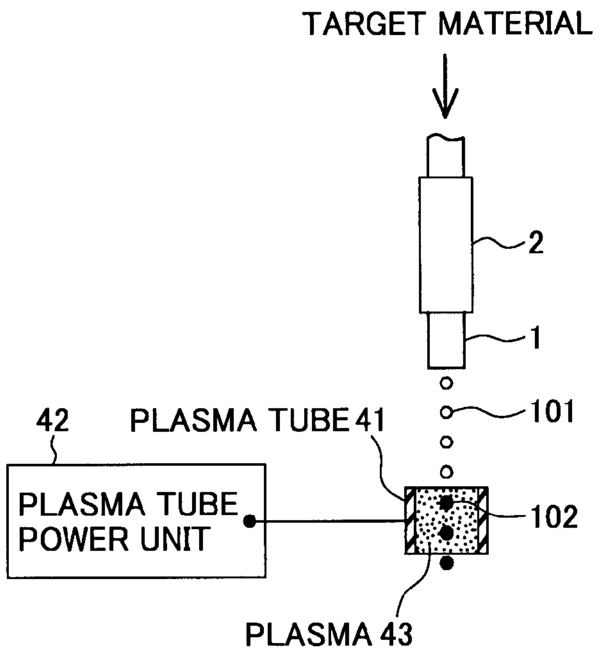
FIG. 5 is a schematic diagram showing a third example structure of an electric charge supplying unit as shown in FIG. 1.

FIG. 5 is a schematic diagram showing a third example structure of the electric charge supplying unit 3 as shown in FIG. 1. In the third example structure, a plasma tube 41 is used as an electric charge supplying unit, and the amount of electric charge is controlled by a plasma tube power unit 42 included in the charge amount control unit 8 (FIG. 1). The plasma tube power unit 42 supplies electric power and plasma gas to the plasma tube 41.

The plasma tube 41 is arranged at downstream of the target nozzle 1 to allow the droplet 101 injected from the target nozzle 1 to pass through inside the plasma, tube 41. By fulfilling the plasma tube 41 with plasma gas and supplying the electric power to the plasma tube 41, the plasma 43 can be generated in the plasma tube 41. Thereby, the droplet 101 is irradiated with the plasma 43 to be electrified when passing through the plasma tube 41. The amount of electric charge is controlled in a feedback manner by adjusting the output power and a supplying amount of the plasma gas based on a measurement result obtained by the charge amount measuring unit 7 (FIG. 1).

Figure 6:
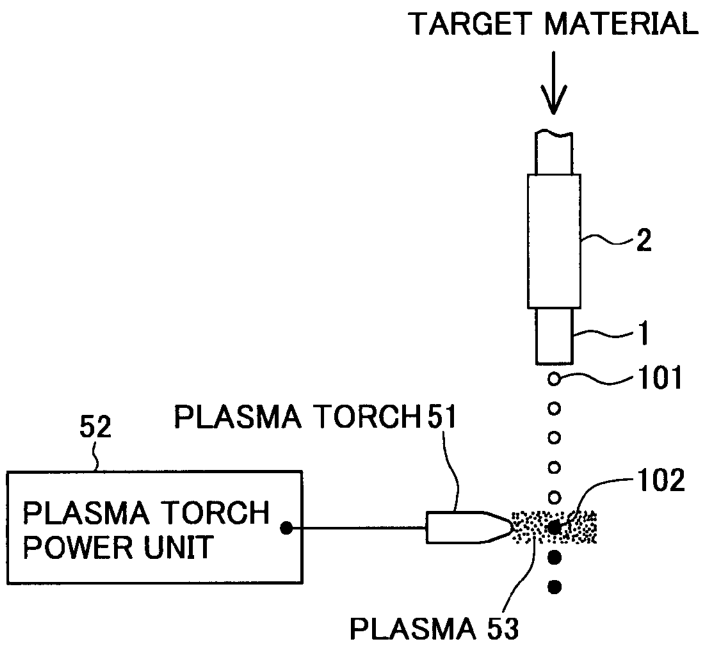
FIG. 6 is a schematic diagram showing a forth example structure of an electric charge supplying unit as shown in FIG. 1.

FIG. 6 is a schematic diagram showing a forth example structure of the electric charge supplying unit 3 as shown in FIG. 1. In the forth example structure, a plasma torch 51 is used as the electric charge supplying unit, and the amount of electric charge is controlled by the plasma torch power unit 52 included in the charge amount control unit 8 (FIG. 1). The plasma torch power unit 52 supplies electric power and plasma gas to the plasma torch 51.

The plasma torch 51 is arranged at downstream of the target nozzle 1 to allow the droplet 101 injected from the target nozzle 1 to pass through a region where plasma is generated. By supplying plasma gas and electric power to the plasma torch 51, the plasma 53 can be generated. Thereby, the droplet 101 is irradiated with the plasma and electrified when passing through the region where plasma is generated. The plasma torch power unit 52 controls the amount of electric charge in a feedback manner by adjusting the output power and the supplying amount of the plasma gas based on a measurement result obtained by the charge amount measuring unit 7 (FIG. 1).

The structures as shown in FIG. 5 and FIG. 6 are suitable in the case where the target material has conductivity, but it can be applied in the case where the target material has no (or low) conductivity. As described above, mixture in which minute metal or oxide particles are dispersed into water or alcohol, ionic solution including metal ions, molten metal, and soon can be used as the target material having conductivity. Further, as the target material having no (or low) conductivity, above-mentioned inert gas, extrapure water, alcohol, and so on can be used. As explained above, the target material may be in a liquid state or solid state when the droplet is electrified.

Figure 7:
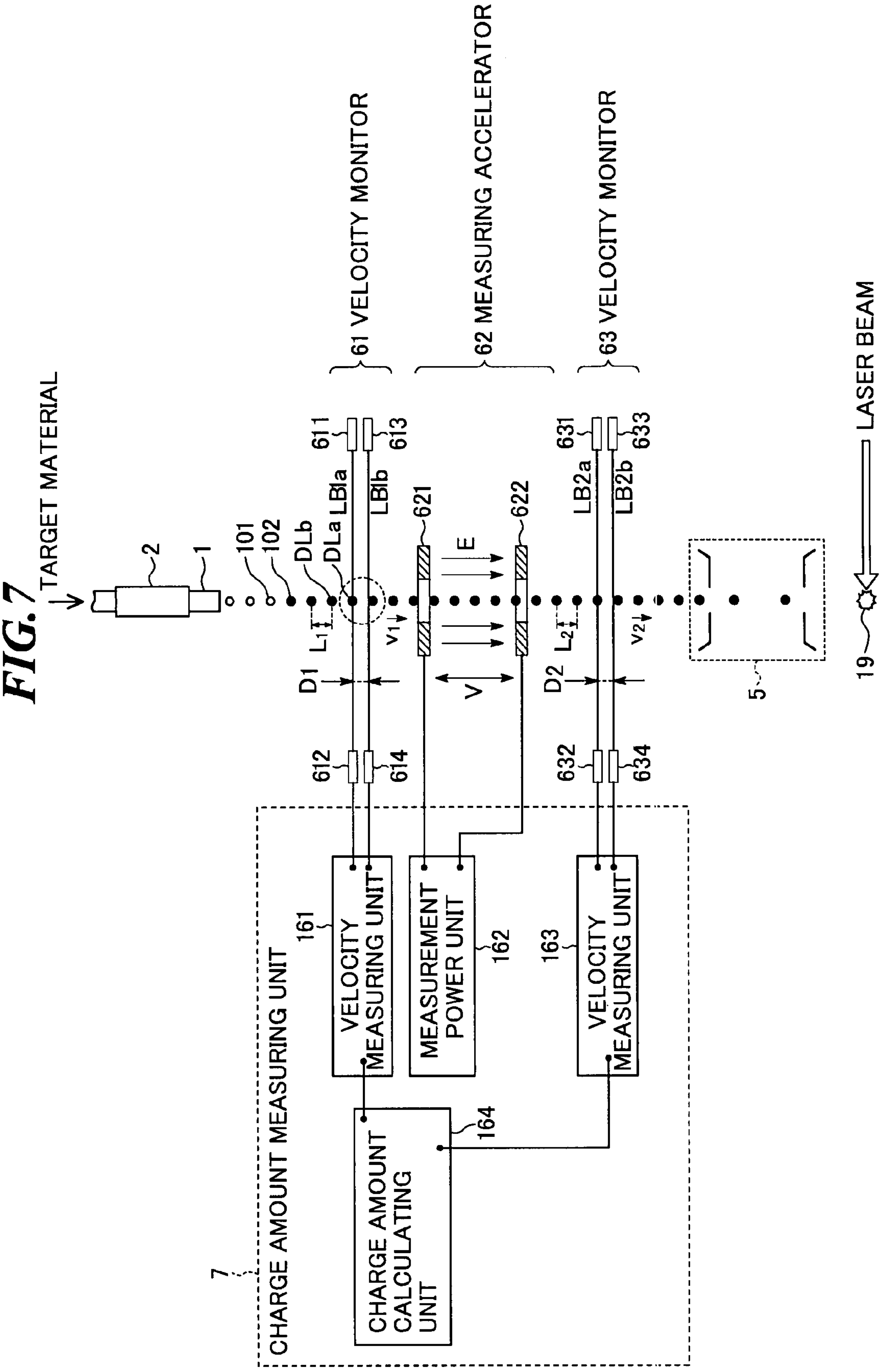
FIG. 7 is a schematic diagram showing structures of a charge amount monitor and a charge amount measuring unit as shown in FIG. 1.

FIG. 7 is a schematic diagram showing structures of an charge amount monitor 4 and a charge amount measuring unit 7 as shown in FIG. 1. As shown in FIG. 7, the charge amount monitor includes a velocity monitor 61 for observing a velocity of the electrified droplet 102, a measuring accelerator 62 for accelerating the electrified droplet 102 at downstream of the velocity monitor 61 in order to measure an amount of the electric charge, and a velocity monitor 63 for observing a velocity of the electrified droplet 102 after having been accelerated. The charge amount measuring unit 7 includes a velocity measuring unit 161 for obtaining a velocity of the electrified droplet 102 based on a signal output from the velocity monitor 61, a measurement power unit 162 for controlling an operation of the measuring accelerator 62, a velocity measuring unit 163 for obtaining a velocity of the electrified droplet 102 after accelerated based on a signal output from the velocity monitor 63, and a charge amount calculating unit 164 for calculating the amount of electric charge of the electrified droplet 102 based on the velocity of the electrified droplet 102 before accelerated and the velocity of the electrified droplet 102 after accelerated.

The velocity monitor 61 includes a laser 611, a laser 613, a photo detector 612 and a photo detector 614. The laser 611 and the laser 613 are positioned to allow a laser beam emitted from each laser to cross the orbit of the electrified droplet 102 at right angles to each other. The photo detector 612 is arranged to detect a laser beam LB1*a* emitted from the laser 611, and the photo detector 614 is arranged to detect a laser beam LB1*b* emitted from the laser 613. Furthermore, the laser 611 and the laser 613 are arranged such that a distance $D_1$ between the laser beam LB1*a* and the laser beam LB1*b* is not larger than an interval $L_1$ of the dropping droplets.

The measuring accelerator 62 includes two acceleration electrode 621 and 622 in each of which an opening is formed to allow the electrified droplet 102 to pass through. The acceleration electrodes 621 and 622 are applied with a voltage "V" by the measurement power unit 162 to form an electrical field "E" parallel to the moving direction of the electrified droplet 102 in the region where the electrified droplet 102 passes through. The measuring accelerator 62 may positively or negatively accelerate the electrified droplet as far as the velocity of the electrified droplet changes between before accelerated and after accelerated.

The velocity monitor 63 includes a laser 631, a laser 633, a photo detector 632 and a photo detector 634. The laser 631 and the laser 633 are arranged to allow a laser beam emitted from each laser to cross the orbit of the electrified droplet 102 after accelerated at right angles to each other. The photo detector 632 is arranged to detect a laser beam LB2*a* emitted from the laser 631, and the photo detector 634 is arranged to detect a laser beam LB2*b* emitted from a laser 633. Further, the laser 631 and the laser 633 are arranged such that a distance $D_2$ between the laser beam LB2*a* and the laser beam LB2*b* is not larger than an interval $L_2$ of the electrified droplets 102 after accelerated.

Figure 8:
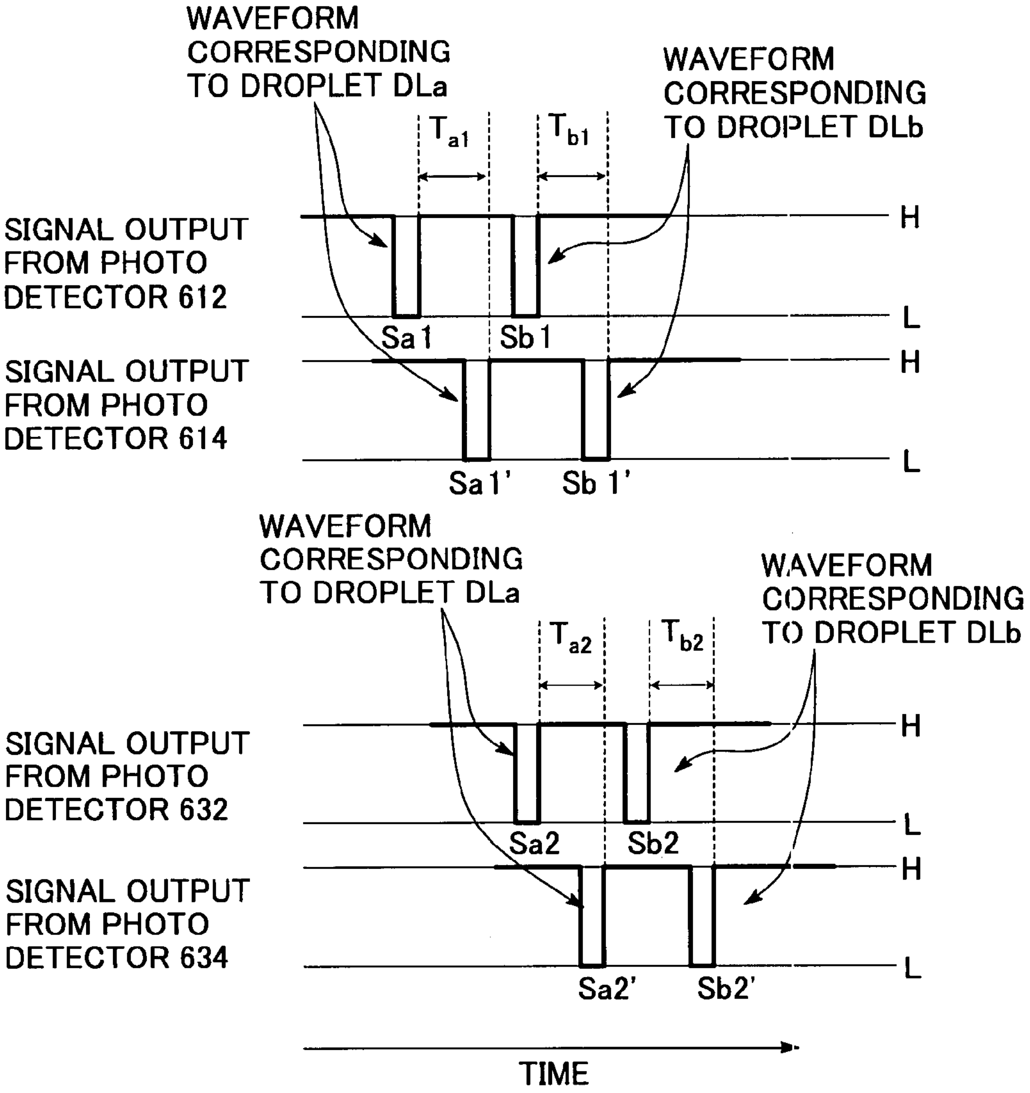
FIG. 8 is a diagram for explaining a method of calculating a velocity of an electrified droplet in a velocity measuring unit as shown in FIG. 7.

FIG. 8 is a diagram for explaining a method of calculating a velocity of the electrified droplet in the velocity measuring units 161 and 163.

When a certain droplet DLa crosses a laser beam LB1*a*, a waveform Sa1 appears in a signal output from the photo detector 612. Then, when the droplet DLa crosses a laser beam LB1*b*, a waveform Sa1' appears in a signal output from the photo detector 614. Since the distance $D_1$ between the two laser beams is not larger than the interval $L_1$ of the droplets, the waveform Sa1' is considered to be a signal representing that the droplet DLa crosses a laser beam LB1*b*. That is, a time distance $T_{a1}$ between the waveform Sa1 and the waveform Sa1' corresponds to a time period required for the droplet DLa to move for the distance $D_1$ between the two laser beams LB1*a* and LB1*b*.

Therefore, the velocity measuring unit 161 calculates a velocity $v_{a1}$ of the droplet DLa based on the following formula.

$$V_{a1}=D_1/T_{a1}$$

Similarly, the velocity measurement 163 calculates the velocity $va_2$ of the droplet DLa after accelerated by the measuring accelerator 62 based on signals (waveforms Sa2, Sa2', Sb2, Sb2', . . . ) output from the velocity monitor 63.

$$V_{a2}=D_2/T_{a2}$$

Here, the time distance $T_{a2}$ between the waveform Sa2 and the waveform Sa2' corresponds to a time period required for the droplet DLa to move for the distance $D_2$ between the two laser beams LB2*a* and LB2*b*.

Further, the charge amount calculating unit 164 calculates the amount of electric charge "Q" of the droplet DLa based on measurement results (velocity $V_{a1}$ and velocity $v_{a2}$) obtained by the velocity measuring units 161 and 163, the mass "m" of the droplet DLa, and the voltage "V" applied to the acceleration electrodes 621 and 622 by the measurement power unit 162 according to the following expressions.

$$QV=(1/2)m(v_{a2}^2-v_{a1}^2)$$

$$Q=(1/2)m(v_{a2}^2-v_{a1}^2)/V$$

Thus, by using signals (waveforms Sa1, Sa1', Sb1, Sb1', . . . ) output from the velocity monitor 61 and signals (waveforms Sa2, Sa2', Sb2, Sb2', . . . ) output from the velocity monitor 63, the amount of the electric charge of the droplets DLa, DLb, . . . sequentially injected from the target nozzle can be obtained.

The identity of the droplet DLa passing through the velocity monitor 61 and the droplet DLa passing through the velocity monitor 63, that is, whether or not the waveforms Sa1 and Sa1' or the waveforms Sa2 and Sa2' represent the same droplet can be determined by previously obtaining examples of combination of the waveforms Sa1 and Sa1' or the waveforms Sa2 and Sa2' based on an order of the pulse generation or a range of the time interval or the like. For example, it is possible to expect a time point when the droplet DLa, which has passed through the velocity monitor 61, will pass through the velocity monitor 63 based on a velocity of the droplet measured by the velocity monitor 61 and a distance between the velocity monitor 61 and the velocity monitor 63, by obtaining them before accelerating the droplet for measurement.

As explained above, according to the embodiment, the velocity of the droplet after accelerated can be kept within a predetermined range by controlling the electric charge supplying unit or the accelerator based on the amount of electric charge of the electrified droplet. Thereby, the droplet arrives at the plasma generation point at correct timing, and therefore, the working distance can be made large. As a result, the target nozzle is prevented from being damaged by the plasma.

In the embodiment, the electric charge supplying unit is controlled in a feedback manner and the accelerator is controlled in a feedfoward manner. However, either one of the control manners may be performed.

Further, in the embodiment, explanation is made in the case where a target material in a liquid state is injected from the nozzle. However, the present invention can be applied not only in the case where a target material in a liquid droplet state or a particle state solidified after injecting liquid droplet is used but also in the case where a target material in a solid particle state is injected from the nozzle.

The invention claimed is:

1. A target supplier to be used in an extreme ultra violet light source device for generating extreme ultra violet light by irradiating a target material with a laser beam emitted from a laser light source to turn the target material into a plasma state, said target supplier comprising:
   - a target nozzle that injects a target material in one of a liquid droplet state and a solid particle state;
   - an electric charge supplying unit that supplies electric charge to the target material;
   - a charge amount monitor including a first velocity monitor for observing a velocity of the target material supplied with the electric charge by said electric charge supplying unit, a measuring accelerator for forming an electrical field to accelerate the target material supplied with the electric charge by said electric charge supplying unit, and a second velocity monitor for observing a velocity of the target material accelerated by said measuring accelerator;
   - a charge amount measuring unit that measures an amount of the electric charge supplied to the target material by said electric charge supplying unit based on output signals of said first velocity monitor and said second velocity monitor;

control means that controls said electric charge supplying unit in a feedback manner based on a measurement result obtained by said charge amount measuring unit; and an accelerator that further accelerates the target material supplied with the electric charge by said electric charge supplying unit.

2. A target supplier according to claim 1, wherein said control means controls said electric charge supplying unit in a feedback manner such that an amount of electric charge supplied to the target material by said electric charge supplying unit is kept within a predetermined range.

3. A target supplier according to claim 1, further comprising:

a second control means that controls said accelerator based on the measurement result obtained by said charge amount measuring unit.

4. A target supplier according to claim 3, wherein said second control means controls said accelerator in a feedforward manner such that a velocity of the target material after accelerated by said accelerator is kept within a predetermined range.

5. A target supplier according to claim 3, wherein said second control means controls said accelerator in a feedforward manner such that a velocity of the target material after accelerated by said accelerator means is kept within a predetermined range.

6. A target supplier according to claim 1, wherein said control means controls said electric charge supplying unit in a feedback manner such that an amount of electric charge supplied to the target material by said electric charge supplying means is kept within a predetermined range.

7. A target supplier according to claim 1, further comprising:

a second control means that controls said accelerator based on the measurement result obtained by said charge amount measuring means.

8. A target supplier to be used in an extreme ultra violet light source device for generating extreme ultra violet light by irradiating a target material with a laser beam emitted from a laser light source to turn the target material into a plasma state, said target supplier comprising:

a target nozzle that injects a target material in one of a liquid droplet state and a solid particle state;

an electric charge supplying unit that supplies electric charge to the target material;

a charge amount monitor including a first velocity monitor for observing a velocity of the target material supplied with the electric charge by said electric charge supplying unit, a measuring accelerator for forming an electrical field to accelerate the target material supplied with the electric charge by said electric charge supplying unit, and a second velocity monitor for observing a velocity of the target material accelerated by said measuring accelerator;

a charge amount measuring unit that measures an amount of the electric charge supplied to the target material by said electric charge supplying unit based on output signals of said first velocity monitor and said second velocity monitor;

an accelerator that further accelerates the target material supplied with the electric charge by said electric charge supplying unit; and control means that controls said accelerator based on a measurement result obtained by said charge amount measuring unit.

9. A target supplier according to claim 8, wherein said control means controls said accelerator in a feedforward manner such that a velocity of the target material after accelerated by said accelerator is kept within a predetermined range.

10. A target supplier to be used in an extreme ultra violet light source device for generating extreme ultra violet light by irradiating a target material with a laser beam emitted from a laser light source to turn the target material into a plasma state, said target supplier comprising:

a target nozzle that injects a target material in one of a liquid droplet state and a solid particle state;

electric charge supplying means for supplying electric charge to the target material;

a charge amount monitor including first velocity monitoring means for observing a velocity of the target material supplied with the electric charge by said electric charge supplying means, measuring accelerator means for forming an electrical field to accelerate the target material supplied with the electric charge by said electric charge supplying means, and second velocity monitoring means for observing a velocity of the target material accelerated by said measuring accelerator means;

charge amount measuring means for measuring an amount of the electric charge supplied to the target material by said electric charge supplying means based on output signals of said first velocity monitoring means and said second velocity monitoring means;

control means for controlling said electric charge supplying unit in a feedback manner based on a measurement result obtained by said charge amount measuring means; and accelerator means for further accelerating the target material supplied with the electric charge by said electric charge supplying means.

* * * * *